United States Patent [19]

Schermann et al.

[11] 4,194,995

[45] Mar. 25, 1980

[54] WATER VAPOR ABSORBING AND TRANSMITTING ADHESIVE, A PROCESS FOR THE MANUFACTURE OF THIS ADHESIVE AND USE THEREOF

[75] Inventors: Walter Schermann; Arno Holst, both of Wiesbaden; Wilhelm Fischer, Pirmasens, all of Fed. Rep. of Germany

[73] Assignee: Hoechst Aktiengesellschaft, Fed. Rep. of Germany

[21] Appl. No.: 932,621

[22] Filed: Aug. 10, 1978

[30] Foreign Application Priority Data

Aug. 11, 1977 [DE] Fed. Rep. of Germany ....... 2736147

[51] Int. Cl.$^2$ ............................ C08L 1/28; C08L 3/08

[52] U.S. Cl. ...................................... 260/14; 106/169; 106/205; 106/210; 260/9; 260/13; 260/16; 260/17 R; 260/17.2; 260/17.4 R; 260/17.4 GC; 260/17.4 CL; 260/17.4 ST; 260/17.4 VC

[58] Field of Search ...................... 260/17.2, 17.4, 14, 260/9, 13, 16, 17

[56] References Cited

U.S. PATENT DOCUMENTS

3,137,664   6/1964   Shulman ...................... 260/17.4 ST

*Primary Examiner*—Edward M. Woodberry
*Attorney, Agent, or Firm*—James E. Bryan

[57] ABSTRACT

This invention relates to an improvement in a water vapor absorbing and transmitting adhesive containing at least one organic binding agent which is insoluble in water, and an addition of at least one hydrophilic polymer, the improvement that the hydrophilic polymer is a swellable modified polymer in the form of small particles. The invention also relates to a process for the manufacture of the adhesive.

5 Claims, No Drawings

WATER VAPOR ABSORBING AND TRANSMITTING ADHESIVE, A PROCESS FOR THE MANUFACTURE OF THIS ADHESIVE AND USE THEREOF

This invention relates to an adhesive which has an improved water vapor absorbing and transmitting capacity and contains an addition of a hydrophilic polymer; the invention further relates to a process for the manufacture of this adhesive and to the use thereof.

When an adhesive is applied to a substrate which is subsequently bonded to a second similar or different substrate, the adhesive film will in most cases form a barrier impermeable to water vapor between the two substrates. Especially, in the manufacture and processing of coated textiles (e.g. for all-weather garments or tent cloths) as well as natural and synthetic leathers (e.g. for shoe uppers, shoe linings, upholstery covers and outer garments) it is, however, essential that the material should be capable of absorbing and transmitting water vapor, in order to ensure, for example, comfortable wearing. The inevitable use of adhesives in the manufacture and processing of these materials will cause certain disadvantages as far as the above-mentioned properties are concerned. Many experiments have, therefore, been carried out to remedy this disadvantage.

Basically, four processes are known which are intended to produce the required properties:

1. Perforation of the adhesive layer by incorporating minute holes in the layer. In this case, however, the permeability to water vapor of the adhesive layer is limited to the perforated parts of the layer, whereas the remaining parts of the layer are still impermeable. In addition, the absorptivity to water vapor of the layer is not at all influenced or only slightly influenced by this process.

2. Application of the adhesive to a substrate in such a manner that the substrate is only incompletely covered, for example, in individual patches, streaks or points; but this process affects the bond strength between two substrates considerably, so that it can be used only for a few special purposes. In addition, the above-described disadvantages remain unchanged in the areas covered by the adhesive.

3. If adhesives containing solvents are used, the solvent may be removed from the adhesive layer in such a manner that the latter gains a certain degree of porosity. This process yields adhesive layers which transmit water vapor to some extent, but satisfactory results are obtained only if the process is carried out with great accuracy; frequently irregularly structured layers are produced, so that there is a risk of a non-uniform bond strength between two substrates. In addition, these layers also have a very limited capacity of absorbing water vapor.

4. A hydrophilic polymer is admixed to the adhesive to produce the required properties in the adhesive. However, this process is limited to particular types of adhesives and although satisfactory values in view of the transmission of water vapor are obtained, the absorption of water vapor is still inadequate.

German Pat. No. 1,006,558, describes an adhesive comprising a butadiene copolymer (butadiene-methylisopropenyl-ketone copolymer) and a cellulose derivative. Suitable cellulose derivatives are cellulose esters, for example, cellulose nitrate or cellulose acetate, and cellulose ethers, for example, benzyl cellulose. The proportions of the above-mentioned, normally filmforming cellulose derivatives should amount to 25 to 75 percent by weight of the copolymer, and the adhesives produced in this manner exhibit a high bond strength.

In the process for the manufacture of adhesives based on water-soluble high-polymer substances containing hydroxyl groups according to DE-AS No. 1,075,773, a substance of this type is, in a finely divided form, reacted with a cross-linking aldehyde or ketone until it becomes insoluble in water or requires a longer time to dissolve in water, but is still swellable in water. Then, a smaller proportion of the substance treated in this way is mixed with a larger proportion of the adhesive based on water-soluble cellulose derivatives. Cellulose derivatives, in particular cellulose ether, modified starch, vegetable gum or polyvinyl alcohol are suitable substances for this process. Favorable properties in the application of these adhesives are improvements in the spreading and sliding properties.

DE-OS No. 1,809,124, discloses an adhesive compound containing a hydrocolloid which is soluble or swellable in water or a mixture of these hydrocolloids and a viscous natural or synthetic rubber-like binding agent which is insoluble in water. Suitable hydrocolloids are polyvinyl alcohol, pectins, gum arabic, gelatin, alginates, carboxymethylcellulose, polyethylene glycols, carboxypolymethylenes and polyoxyethylenes. The adhesive compound will adhere immediately upon very different wet surfaces and will not lose its adhesive properties even if dry surfaces to which the adhesive material has been applied become wet.

DE-AS No. 2,364,125, describes a pressure-sensitive adhesive mixture composed of 90 to 99 parts by weight of a tacky copolymer comprising an alkyl acrylate, the alkyl group of which contains 1 to 14 carbon atoms, with an average number of 4 to 12 carbon atoms, and a monomer which has a double bond and is, thus, copolymerizable, and 10 to 1 parts by weight of a hydroxyethyl cellulose. The field of application mentioned for this adhesive mixture is its use as an adhesive layer permeable to gas and humidity on a substrate which is also permeable to gas and humidity in the manufacture of pressure-sensitive breathing adhesive tapes or adhesive sheet-like materials.

It is an object of the invention to provide an adhesive capable of absorbing and transmitting water vapor, which is improved as compared with previously proposed adhesives and may contain binding agents of various kinds in different adhesive systems.

The invention is based on a water vapor absorbing and transmitting adhesive comprising at least one organic binding agent which is insoluble in water, an addition of at least one hydrophilic polymer and, if appropriate, an organic solvent and/or water. In the adhesive according to the invention, the hydrophilic polymer is a swellable modified polymer in the form of small particles. Swellable polymers are those which swell in aqueous liquids, in particular liquids containing more than 50 percent by weight of water, or which swell by the action of water molecules (e.g. water vapor) coming into contact with them in another way. The polymer is, in particular, water-insoluble to the extent of at least 50 percent by weight.

In a preferred embodiment, the adhesive contains about 5 to 30 percent by weight of these polymers, relative to the entire dry adhesive mass.

As the polymers in the form of small particles, i.e. particularly pulverulent or fibrous swellable modified polymers having a particle size of ≦250 μm, preferably of ≦150 μm, the following modified polymers are, for example, suitable for use in the adhesive according to the invention:

A cross-linked polyalkylene oxide, for example, as described in German Offenlegungsschrift No. 2,048,721. To manufacture this product, water-soluble polyalkylene oxides are preferably treated with ionizing radiation of sufficient intensity to effect cross-linking and to render the polymer insoluble. The polyalkylene oxide can be irradiated in the solid state or in solution.

An absorbent, cross-linked copolymer containing carboxyl groups, for example, as described in German Offenlegungsschrift No. 2,507,011, and obtained from an α,β-unsaturated acid and an acetal of the general formula

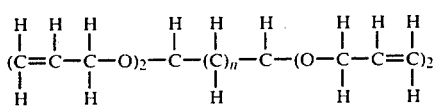

where n is 0, 1 or 2. Acrylic acid, methacrylic acid, itaconic acid, α-phenylacrylic acid or an α-benzylacrylic acid are particularly suitable as the α,β-unsaturated acid; in the manufacture of this copolymer, 0.1% to 15% by weight of the acetal are advantageously used per 85% to 99.9% by weight of an unsaturated acid.

A hydrocolloidal polymer, for example as disclosed in U.S. Pat. No. 3,670,731 (=DE-OS No. 1,642,072), which has been rendered water-insoluble by cross-linking and is suitable for absorbing liquids and also retaining them; certain polyacrylamides, alkali metal salts of hydrolyzed polyacrylamides and alkali metal salts of polystyrene sulfonic acids are especially useful.

A cross-linked, insoluble, physiologically harmless polymer which is swellable in water, for example as disclosed in U.S. Pat. No. 3,669,103 (=DE-OS No. 1,617,998) including poly-N-vinylpyrrolidones, polyacrylamides, polyacrylic acid and polyglycols.

Absorbent polymers which are at least substantially water-insoluble and swellable in water and which are manufactured as described in, for example, German Offenlegungsschrift No. 2,541,035; and prepared by etherification, in a homogeneous phase, of polyhydroxymethylene in an aqueous-alkaline solution with an α-halogenocarboxylic acid and by reaction, before, during or after the etherification, with a cross-linking agent which in an alkaline medium is polyfunctional towards polyhydroxymethylene.

The following swellable, modified carbohydrate derivatives are especially suitable for use in the invention: alkali metal salts of carboxymethylcellulose, which are heat-treated and are swellable in water, prepared as described, for example, in U.S. Pat. No. 2,639,239, by reducing the solubility of a water-soluble alkali metal salt of carboxymethylcellulose having a D.S. (=degree of substitution, i.e. the number of substituted hydroxyl groups on one anhydro-D-glucose unit) of 0.5 up to about 1, by subjecting the dry salt, in a finely divided form, to a temperature of about 130° C. to about 210° C., highly swellable gel particles being obtained.

Water-insoluble, heat-treated carboxyalkylcelluloses, which absorb and retain liquids, as described in, for example, U.S. Pat. No. 3,723,413 (=DE-OS No. 2,314,689); manufactured by a procedure in which (a) cellulose materials are treated with carboxyalkylating reactants to form water-soluble carboxyalkylcellulose which has an average degree of substitution of more than 0.35 carboxyalkyl radicals per anhydroglucose unit in the cellulose but which possesses poor properties with respect to the absorption and retention of liquids, (b) a proportion of the carboxyalkylating reactants and the by-products formed during the reaction is removed so that, relative to the weight of the water-soluble carboxyalkylcellulose, at least about 3% by weight thereof remain and (c) the carboxyalkylcellulose is subjected to a heat treatment in the presence of the remaining carboxyalkylating reactants and by-products of the reaction and, thus, is rendered water-insoluble, and excellent properties with respect to the absorption and retention of liquids are imparted to the carboxyalkylcellulose.

Absorbent carboxymethylcellulose fibers which are suitable for use in fiber materials for absorbing and retaining aqueous solutions and are substantially water-insoluble, as described, for example, in U.S. Pat. No. 3,589,364 (=DE-OS No. 1,912,740); fibers of this type consist of wet-cross-linked fibers of water-soluble salts of carboxymethylcellulose having a D.S. of about 0.4 to 1.6 and possess the original fiber structure. Preferably, about 3 to 10 percent by weight of epichlorohydrin are employed as the cross-linking agent.

Chemically cross-linked, swellable cellulose ethers, according to U.S. Pat. No. 3,936,441 (=DE-OS No. 2,357,079); these cross-linked cellulose ethers, in particular those obtained from carboxymethylcellulose, carboxymethyl hydroxyethylcellulose, hydroxyethylcellulose or methylhydroxyethylcellulose, are manufactured by reacting the ethers, which in themselves are water-soluble, in an alkaline reaction medium with a cross-linking agent, the functional groups of which are the acrylamido group 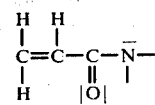

the chloro-azomethine group 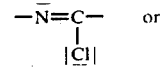

the allyloxy-azomethine group 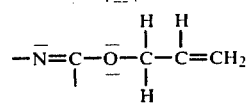

or which cross-linking agent is dichloroacetic acid or phosphorus oxychloride.

Chemically modified swellable cellulose ethers, according to U.S. Pat. No. 3,965,091 (=DE-OS No. 2,358,150); these cellulose ethers which have not been modified by cross-linking are manufactured by reacting the ethers, which in themselves are water-soluble, in an alkaline reaction medium with a monofunctionally reacting compound having one of the two formulae

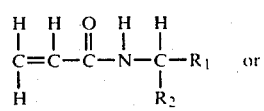  I $$\begin{array}{c} H \quad H \\ | \quad | \\ C=C-SO_2-NH_2 \\ | \\ H \end{array} \quad \text{II}$$

wherein $R_1$ denotes an hydroxyl group, an acylamino group or an esterified carbamino group, and $R_2$ denotes hydrogen or a carboxyl group.

Chemically cross-linked swellable cellulose ethers, according to German Offenlegungsschrift No. 2,519,927; these cross-linked cellulose ethers are manufactured by reacting the ethers, which in themselves are water-soluble, in an alkaline reaction medium with bis-acrylamido-acetic acid as the cross-linking agent.

Free-flowing, hydrophilic carbohydrates, which are cross-linked by radiation, and are swellable in water, according to German Auslegeschrift No. 2,264,027; these products are manufactured (in the case of certain polymers, such as polyethylene oxide or polyvinyl alcohol, similar products also can be obtained by the reaction steps which follow) by:

(a) mixing at least one water-soluble, pulverulent polymeric carbohydrate with such an amount of at least one pulverulent inert filler, the particles of which are smaller than those of the carbohydrate, and in such a way that a substantial part of the surface of the pulverulent carbohydrate is covered, (b) while the mixing is continued, contacting the mixture, while stirring thoroughly, with a finely divided water spray in such an amount that the mixture remains in the form of free-flowing particles and (c) then subjecting the resulting mixture to ionizing radiation until the polymeric carbohydrate is cross-linked.

Chemically cross-linked or otherwise modified swellable starch ethers, according to German Application No. P 26 34 539.1; these special starch ethers are manufactured by, for example, carrying out, as the modification, cross-linking with a cross-linking agent which is phosphorus oxychloride or which carries one of the following functional groups reactive towards hydroxyl groups:

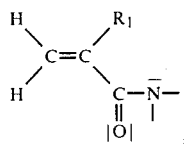 the acrylamido group. $R_1$ being H or $CH_3$

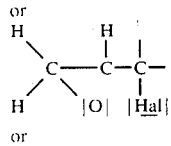 an α-halogenoepoxy group. Hal being Cl or Br

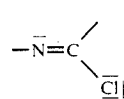 the chloro-azomethine group

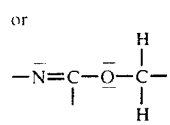 the allyloxy-azomethine group.

The procedure in another mode of manufacture is that the modification is carried out using a compound which is monofunctionally reactive under the stated conditions towards the hydroxyl groups of starch or of the starch ether and which is described by one of the general formulae which follow:

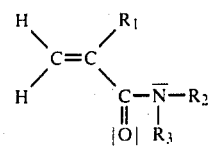

or

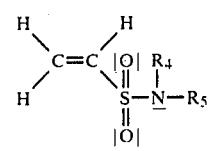

$R_1$ being $CH_3$ or H, $R_2$ being H and $R_3$ being $CH_3$, $CH_2$—OH, a N-methylene-acylamido group with 1 to 3 carbon atoms, an esterified N-methylene-carbamido or N-carboxymethylene-carbamido group with 2 to 7 carbon atoms, or $R_2$ and $R_3$ being $CH_3$ or $CH_2$—OH and $R_4$ and $R_5$ being H or $R_4$ being H and $R_5$ being $CH_3$ or $R_4$ and $R_5$ being $CH_3$.

Alkali metal salts of carboxymethylcellulose, having an increased absorption capacity and retention capacity, as described, for example, in U.S. Pat. No. 3,678,031 ('DE-OS No. 2,151,973). Although the etherifying agents here employed contain carboxyl groups and would lead to a normally soluble cellulose ether, the conditions of the reaction are selected so that alkali metal salts of carboxymethylcellulose, having a D.S. of 0.4 to 1.2, a water-soluble fraction of <35%, a water retention value (WRV) of about 1,000 to 7,000 and a salt water retention value of 400 to about 2,500, are formed.

Water-insoluble carboxymethylcelluloses, such as are used, for example, in German Pat. No. 1,079,796, and German Auslegeschrift No. 1,151,474, i.e. those which have a D.S. of 0.05 to 0.3 and those which are substantially water-insoluble and also have a low D.S.

Water-insoluble, more highly polymerized carboxymethylcellulose or carboxyethylcellulose with a significant content of free carboxyl groups, as described, for example, in British Pat. No. 725,887 (=German Pat. No. 1,037,076), which are rendered water-insoluble by heating the water-soluble acid compounds to 80° C. to 177° C.

Phosphorylated cellulose fibers, as described, for example, in German Offenlegungsschrift No. 2,447,282, such as can be produced by a reaction of cellulose pulp with urea and phosphoric acid under the action of heat, subsequent acid hydrolysis and ultimately a conversion into the form of a salt.

Dry, solid, water-insoluble absorbents, which are swellable with water, as described, for example, in German Offenlegungsschrift No. 2,609,144, which consist of an ionic complex of a water-insoluble anionic polyelectrolyte and a cation of a metal which is at least trivalent; suitable polyelectrolytes are polyacrylic acid, starch derivatives or cellulose derivatives.

Cellulose graft polymers, as described, for example, in German Offenlegungsschrift No. 2,516,380, which are prepared by grafting side chains of ionic or non-ionic polymer radicals onto cellulose. For example, polyacrylic acid, sodium polyacrylate, polymethacrylic acid, potassium polymethacrylate, polyvinyl alcohol sulfate, polyphosphoric acid, polyvinylamine, poly-(4-vinylpyridine), hydrolyzed polyacrylonitrile, polymethyl methacrylate, polyvinyl acetate, polystyrene or polybutadiene are suitable for this purpose.

Granulated, water-insoluble alkali metal carboxylate salts of starch/acrylonitrile graft copolymers, as described, for example, in U.S. Pat. No. 3,661,815, which are manufactured by saponifying starch/acrylonitrile graft copolymers with a base in an aqueous-alkaline medium.

Modified cellulose material, having an improved retention capacity both for water and physiological fluids, as described, for example, in German Offenlegungsschrift No. 2,528,555, which is prepared by grafting an olefinically unsaturated, polymerizable monomer with hydrolyzable functional groups or a monomer carrying functional carboxyl groups onto a fibrous cellulose material and hydrolyzing the grafted product or treating the latter with alkali in other ways. In this process, the product is first converted to the state of maximum swelling, is then acidified to a pH value at which it is in the state of minimum swelling, is then converted to the form of a salt under conditions which do not effect swelling, and is finally dried.

Modified polysaccharide, as described, for example, in German Offenlegungsschrift No. 2,647,420, manufactured from a polysaccharide, acrylamide, another vinyl monomer and a divinyl monomer, under the conditions of a free-radical reaction.

The basic substances for the adhesives, processes for their manufacture and different bonding methods are known. Within the scope of the present invention the following adhesives are, in particular, included:

Solvent-based adhesives in which the basic substance is dissolved in organic solvents; these adhesives set physically, by evaporation of the solvents contained therein;

dispersion adhesives in which the basic substance is dispersed in water and/or another continuous liquid phase; these adhesives set physically, by evaporation of the water and/or the other phase;

two-component adhesives comprising two adhesive components which are mixed immediately prior to application to the surfaces to be bonded; one of the two adhesive components may, e.g., by a plastic or rubber adhesive, and the other may be the "curing" or "cross-linking" agent, for example, a polyisocyanate; following mixing the two components react chemically, e.g., by cross-linking;

synthetic resin adhesives which are non-hardening, fusible resins and normally do not contain a solvent; the adhesive film is obtained by fusing and setting.

The basic substances used for the adhesives according to the invention are organic binding agents which are insoluble in water, in particular binding agents based on natural or synthetic rubber or a semi-synthetic or synthetic polymer. They include, for example, cellulose ethers, e.g., nitrocellulose or cellulose acetate, rubber in the form of latex or in a solid, broken-up form, rubber components and polyisocyanate components, copolymers of butadiene and styrene and of butadiene and acrylonitrile, polychlorobutadiene (=polychloroprene), polyesters, polyisocyanates, polyisocyanate components and hydroxy polyester components, polyurethanes, polyvinylchloride, polyisobutylene, polyvinyl acetals, polyvinyl acetate, polyvinyl ether and polyacrylic acid ester and polymethacrylic acid ester.

The organic solvents used are, for example, the following:

Alcohols such as methanol or ethanol; ketones such as acetone, methyl ethyl ketone, cyclohexanone or methyl cyclohexanone; esters such as methyl acetate, ethyl acetate, cyclohexyl acetate or ethylene glycol monomethyl ether acetate; hydrocarbons such as gasoline, benzene or toluene; chlorinated hydrocarbons such as methylene chloride, carbon tetrachloride, dichloroethane or trichloroethane; tetrahydrofuran or carbon disulfide, either individually or as mixtures of two or more of them.

Among others, the adhesives may contain plasticizers, agents enhancing the adhesive power, reaction accelerators or retarders, liquefying agents, fillers, extenders or dyes.

Among the bonding methods the following are most frequently used:

Wet Bonding—In this method the substrates are joined while the adhesive is wet, i.e. one or both adhesive layers still contain substantial proportions of a solvent or dispersing agent;

Contact Bonding—In this method the adhesive is applied to the two surfaces to be joined of two substrates; after a certain period ("setting time") the applied adhesive layers which are apparently dry to the touch, when joined under slight pressure, form bonds of an immediately measurable strength within a period ("open assembly time" or "contact bonding time") depending, among other things, upon the temperature and the atmospheric humidity;

Hot-melt Bonding—In this method the adhesive applied to a substrate forms after setting tack-free ("non-blocking") adhesive layers which are capable of bonding upon adequate heating and may be joined under pressure to another adhesive mixture or to a second substrate; they form strong permanent bonds after cooling;

Solvent-activated Bonding—In this method the adhesive applied to a substrate forms after setting tack-free ("non-adhesive") adhesive layers; these layers are again capable of forming bonds when they are moistened with solvents, and they may be joined under pressure to another adhesive coating or to a second substrate; following evaporation of the solvent they produce a strong permanent bond.

For a detailed description of the technology of adhesives and bonding methods see, for example, "Ullmanns Encyklopädie der technischen Chemie," Verlag Urban & Schwarzenberg, München 1957, volume 9, third edition, headword "Klebstoffe," page 578 et seq.

In some bonding methods, for example, in the application of an adhesive layer to a sheet material comprising a non-woven fabric, it is intended to bond the non-woven particles with one another, in addition to forming an adhesive film. Also in this application the adhesive according to the invention yields good results.

When carrying out the examples, the following adhesives were, especially, used (parts are parts by weight, percentages are percent by weight):

1. Polychloroprene adhesive prepared from
   19.1% of polychloroprene
   8.0% of a phenolic resin
   24.9% of toluene
   24.0% of gasoline
   24.0% of ethyl acetate
2. Polyurethane adhesive prepared from
   20% of polyurethane (Desmocoll 400 ®, trademark of Bayer AG, Germany)
   40% of ethyl acetate 40% of methyl ethyl ketone
3. Synthetic resin dispersion adhesive prepared from
   100 parts of a 60% aqueous polyvinyl acetate dispersion
   50 parts of water
4. Natural rubber latex adhesive prepared from
   167 parts of a 60% natural latex
   10 parts of a phenolic resin.

When preparing the adhesives according to the invention, the particles of at least one swellable modified polymer, preferably in a proportion of 5 to 30 percent by weight, relative to the entire dry adhesive mass, are added to the basic substances of the adhesives prior to processing and are uniformly distributed therein; the mixture is then spread or shaped in another way. By the term "uniformly distributed" a random distribution is to be understood.

When heat is applied to accelerate setting or to activate the adhesive, a particular upper temperature limit should, if possible, not be exceeded, i.e. the adhesive according to the invention should not be heated for more than 10 minutes to a maximum temperature of about 150° C.; and for longer periods it should not be heated to temperatures exceeding about 120° C. to 130° C. In the case of an adhesive in the form of an aqueous or water-containing dispersion it is advisable to increase the water content of the adhesive prior to or simultaneously with the addition of the swellable modified polymers in the form of small particles in order to maintain the adhesive in a consistency in which it may be readily processed.

The adhesives according to the invention exhibit an excellent capability of absorbing and transmitting water vapor, which by far exceeds a mere transport effect of the incorporated particles. In addition, the adhesives can release the absorbed water vapor again under certain conditions, for example, when transported to different climatic conditions.

The specified properties of the adhesives according to the invention depend not only upon the clearly demonstrable effect produced by the addition of the particles of at least one swellable modified polymer, but also upon the thickness of the adhesive film or coating, respectively. Therefore, the film or coating is appropriately prepared in a thickness from about 0.01 to about 0.5 mm, in particular if a good absorption of water vapor is to be obtained, in addition to a good transmission of water vapor.

The adhesives according to the invention having the specified properties are preferably used for bonding sheet materials in the manufacture and processing of coated textiles and natural and synthetic leathers, i.e., materials suitable for applications where, under physiological conditions, body fluids (e.g. perspiration) may occur; for example, materials for outer garments (all-weather or leather garments), shoe uppers, shoe linings or shoe insoles.

The abbreviations and terms used in the description and in the examples for describing the sheet materials according to the invention and the swellable modified polymers present therein are defined as follows:

WRV: Water retention capacity of the swellable modified polymer in % by weight, measured against 2,000 times the acceleration due to gravity, relative to its water-insoluble fraction; WRV is determined after immersing the sample in water.

WUA: Water-insoluble fraction in the swellable modified polymer.

DS: Degree of substitution, i.e. the number of substituted hydroxyl groups on the anhydro-D-glucose units, from 0.0 to 3.0.

SV: Absorbency of the swellable modified polymer for a 1% NaCl solution in percent by weight, relative to its total weight; SV is determined after a 1% aqueous NaCl solution has been absorbed by the sample up to saturation.

WDD: Water vapor transmission rate (in accordance with W. Fischer and W. Schmidt, "Das Leder," E. Roether-Verlag, Darmstadt, 27, 87 et seq. (1976). The interior of the apparatus is maintained at 32° C., and the sample (which forms a "window" to the apparatus) is under standard climatic conditions—unless otherwise stated—of 23° C./50% relative humidity, these conditions being kept constant by means of a gentle stream of air from a fan mounted above the apparatus. The free test surface has an area of 10 $cm^2$. Inside the apparatus, the water at 32° C. and the atmosphere above the water, which is saturated with water vapor, are kept in continuous motion with the aid of a magnetic stirrer. To determine the WDD, the weight loss of the test vessel with the sample is determined. WDD is expressed in $mg/cm^2 \cdot x$ hours (in most cases x is 1, but it can also be 8 or 24).

WDA: Water vapor absorption (see also WDD). The water vapor absorption is determined simultaneously with the measurement of WDD, by determining the increase in weight of the sample; unless otherwise stated, the sample is permeable with respect to the outside climatic conditions, i.e., it is not covered.

In all of the examples which follow the representative modified swellable polymers used are sodium carboxymethyl celluloses which are chemically cross-linked with bisacrylamido acetic acid and which have the following parameters: WUA $\geq$ 70%, WRV = 400 to 700%, SV = 800 to 1,400%, DS = 0.8 to 1.1 and a particle size of $\leq$ 200 $\mu$m with a proportion of 90 percent by weight of $\leq$ 100 $\mu$m.

EXAMPLES 1 to 4 and COMPARATIVE
EXAMPLES V 1 and V 2 (see Table)

Adhesive films according to the invention are prepared; they are examined in view of their transmission and absorption of water vapor and are compared to similar films without addition.

The adhesives are composed as follows:

Example V 1: Polychloroprene adhesive without addition

Example 1: Polychloroprene adhesive comprising an addition of 15% by weight of a modified swellable polymer Example 2: Polychloroprene adhesive comprising an addition of 20% by weight of a modified swellable polymer Example V 2: Polyurethane adhesive without addition Example 3: Polyurethane adhesive comprising an addition of 15% by weight of a modified swellable polymer Example 4: Polyurethane adhesive comprising an addition of 20% by weight of a modified swellable polymer.

In all cases, the addition according to the invention produces a pronounced increase of the WDD and WDA values which will increase even further with an increasing amount of addition.

EXAMPLES 5 to 10 and COMPARATIVE EXAMPLES V 3 to V 8

The peel resistances L of adhesives with and without an addition according to the invention are determined in accordance with DIN 53 273 (draft dated March 1976). The peel resistance L is the force, relative to the joint of a test piece, which is required to separate the test piece in a peel test. The substrate specimens concerned are composed of rubber and/or leather. The substrate surfaces are cleaned and roughened and strips of 150 mm×30 mm are punched out. The adhesive is stored at a temperature of 23° C.±2° C. until it has attained this temperature: according to its type the adhesive is then applied to at least one of the substrates to be joined, in such a manner that two substrate strips cover each other and are bonded over a length of 100 mm. The unbonded ends of the test pieces are bent outwardly and are clamped in a tensile testing machine over a length of 20 mm. The two ends are pulled apart at a speed of 100 mm/minute. The peel resistance L is the force obtained as the value or the mean value of several test pieces, measured over the separating distance, i.e.:

$$L = \frac{\text{value of the force in } N \text{ read during the separating procedure}}{\text{width of the test piece in mm}}$$

The adhesives are composed as follows:

Examples V 3/V 4: Polyurethane adhesive without addition

Examples 5/6: Polyurethane adhesive comprising an addition of 15% by weight of a modified swellable polymer Examples V 5/V 6: Polychloroprene adhesive without addition Examples 7/8: Polychloroprene adhesive with an addition of 15% by weight of a modified swellable polymer Example V 7: natural rubber latex adhesive without addition Example 9: natural rubber latex adhesive with an addition of 15% by weight of a modified swellable polymer Example V 8: polyvinyl acetate adhesive without addition Example 10: polyvinyl acetate adhesive with an addition of 15% by weight of a modified swellable polymer.

According to DIN 53 273 the adhesives specified have the following peel resistances (in N/mm) when the test materials bonded are:

rubber/rubber: 9.6 (Example V 3), 9.5 (Example 5), 8.7 (Example V 5) and 8.4 (Example 7), rubber/leather: 8.7 (Example V 4), 8.9 (Example 6), 8.3 (Example V 6) and 8.4 (Example 8), leather/leather: 1.5 (Example V 7), 1.5 (Example 9), 1.3 (Example V 8), and 1.4 (Example 10).

As can be seen, the peel resistances do not change or change only insignificantly, which means that the bond strength of the adhesives is at most only slightly influenced by the addition according to the invention.

| Example | Thickness of Specimen (mm) | Size of Specimen (mm²) | WDD mg/cm² . 8h | WDD mg/cm² . 1h | WDA mg/cm² . 8h | WDA % by weight |
|---|---|---|---|---|---|---|
| V 1 | 0.20–0.25 | 10 | 0.79 | 0.10 | 0.22 | 0.60 |
| 1 | 0.30–0.35 | 10 | 5.86 | 0.73 | 12.91 | 12.27 |
| 2 | 0.40 | 10 | 16.47 | 2.06 | 19.91 | 40.08 |
| V 2 | 0.40 | 10 | 2.10 | 0.26 | 0.22 | 0.39 |
| 3 | 0.40 | 10 | 3.26 | 0.41 | 6.95 | 14.01 |
| 4 | 0.41 | 10 | 6.63 | 0.83 | 10.20 | 20.88 |

EXAMPLES 11 to 13 and COMPARATIVE EXAMPLE V 9

Polyester staple fibers (polyethyleneglycol terephthalate, 1.3 dtex, 38 mm long) are processed by means of carding machines and leasing machines to give a web which has a weight per unit area of about 150 g/m² and which is slightly consolidated mechanically in a preliminary needle-punching loom. The needle-punched web is then bonded with an aqueous, polyurethane-containing medium (binder content approximately 65 to 70 percent by weight, based on the fiber proportion), for example by dip-impregnation on the padder with the following components: aqueous polyurethane dispersion, anionic and non-ionic emulsifiers, aqueous Ca(NO₃)₂ solution, leather dyestuff, and (except in the comparative example) an addition of the modified swellable polymer. The polyurethane may be present either as a binder for the web or as an adhesive layer disposed on the bonded web. The impregnated web is dried for about 50 minutes at about 110° C.

Example 11: 5% by weight addition of the modified swellable polymer, based on the solids content of the binder, Example 12: 10% by weight addition of the modified, swellable polymer, Example 13: 15% by weight addition of the modified, swellable polymer, and Example V9: no addition of modified, swellable polymer.

| Example | Thickness of Specimen (mm) | Size of Specimen (mm²) | WDA (% by weight) after 4 h | 8 h | 24 h | WDA (mg/cm² . 8h) |
|---|---|---|---|---|---|---|
| V 9 | 1.05 | 50 . 100 | 3,78 | 4,23 | 4,56 | 5,99 |
| 11 | 1,10 | 50 . 100 | 4,55 | 5,41 | 6,09 | 8,16 |
| 12 | 1,10 | 50 . 100 | 5,26 | 6,21 | 7,02 | 9,03 |
| 13 | 1,15 | 50 . 100 | 5,93 | 7,48 | 9,44 | 12,62 |

It will be obvious to those skilled in the art that many modifications may be made within the scope of the present invention without departing from the spirit thereof, and the invention includes all such modifications.

What is claimed is:

1. In a water vapor absorbing and transmitting adhesive containing at least one organic binding agent which is insoluble in water, and an addition of at least one hydrophilic polymer, the improvement comprising that said hydrophilic polymer is a swellable modified starch ether or cellulose ether, which is modified by cross-linking effected by heat energy, or radiation, or by an additional chemical compound, which is insoluble in water to the extent of at least about 50 percent by weight, and which swells in aqueous liquids.

2. An adhesive according to claim 1 including an organic solvent and/or water.

3. An adhesive according to claim 1 containing the swellable modified polymer in a proportion of about 5 to 30 percent by weight, relative to the entire dry adhesive mass.

4. A process for the manufacture of a water vapor absorbing and transmitting adhesive containing at least one organic binding agent which is insoluble in water and an addition of a hydrophilic swellable modified polymer in the form of small particles comprising (a) adding the particles of said swellable modified polymer, which is a starch ether or cellulose ether, which is modified by cross-linking effected by heat energy or radiation, or by an additional chemical compound, which is insoluble in water to the extent of at least about 50 percent by weight, and which swells in aqueous liquids, to basic material of the adhesive prior to processing, (b) uniformly distributing the particles therein, and (c) spreading the mixture.

5. A process according to claim 4 including adding the particles in a proportion of 5 to 30 percent by weight, relative to the entire dry adhesive mass.

* * * * *